US012670746B2

(12) United States Patent
Komada et al.

(10) Patent No.: US 12,670,746 B2
(45) Date of Patent: Jun. 30, 2026

(54) DEVICE AND METHOD FOR MANAGING CARDON DIOXIDE EMISSIONS FOR PRODUCTS

(71) Applicant: TOYOTA JIDOSHA KABUSHIKI KAISHA, Toyota (JP)

(72) Inventors: Atsushi Komada, Nagakute (JP); Mitsuru Ogasawara, Gamagori (JP); Masahiko Ishii, Okazaki (JP); Hidetaka Asano, Nissin (JP); Tomokazu Ishii, Okazaki (JP); Koji Hetsugi, Toyota (JP); Kosuke Yonekawa, Nissin (JP); Yoshikazu Jikuhara, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 377 days.

(21) Appl. No.: 18/207,775

(22) Filed: Jun. 9, 2023

(65) Prior Publication Data

US 2024/0046712 A1    Feb. 8, 2024

(30) Foreign Application Priority Data

Aug. 3, 2022    (JP) ................................. 2022-124023

(51) Int. Cl.
| | |
|---|---|
| *G07C 3/00* | (2006.01) |
| *G06Q 10/063* | (2023.01) |
| *G06Q 50/04* | (2012.01) |
| *G07C 3/14* | (2006.01) |

(52) U.S. Cl.
CPC .......... *G07C 3/005* (2013.01); *G06Q 10/063* (2013.01); *G06Q 50/04* (2013.01); *G07C 3/00* (2013.01); *G07C 3/143* (2013.01); *G07C 3/146* (2013.01)

(58) Field of Classification Search
CPC .......... G07C 3/00; G07C 3/005; G07C 3/143; G07C 3/146; G06Q 10/06; G06Q 10/063;
(Continued)

(56) References Cited

U.S. PATENT DOCUMENTS

| | | | | |
|---|---|---|---|---|
| 9,491,005 B2 * | 11/2016 | Lee | ......................... | H04L 12/66 |
| 2004/0093098 A1 * | 5/2004 | Ohki | ..................... | G06Q 10/10 700/90 |

(Continued)

FOREIGN PATENT DOCUMENTS

| | | | | | |
|---|---|---|---|---|---|
| CN | 113205247 A | * | 8/2021 | ....... | G06Q 10/06312 |
| CN | 114446037 A | * | 5/2022 | ............. | H04L 67/06 |

(Continued)

*Primary Examiner* — Crystal J Barnes-Bullock

(74) *Attorney, Agent, or Firm* — Oliff PLC

(57) ABSTRACT

A management device is configured to manage $CO_2$ emission amounts emitted from production of products on a production line. The management device includes a storage device configured to store a unit weight of a first product and a unit weight of a second product produced on the production line, and a control device that is configured to proportionally divide an electric power consumption amount consumed on the production line over a predetermined period, based on a weight ratio of a total weight of the first product and a total weight of the second product produced on the production line over the predetermined period, and calculate the $CO_2$ emission amount for each product.

4 Claims, 4 Drawing Sheets

(58) Field of Classification Search

CPC ......... G06Q 10/0637; G06Q 10/06311; G06Q 10/06313; G06Q 10/06315; G06Q 10/10; G06Q 30/018; G06Q 40/08; G06Q 50/04; G06Q 50/06; G06Q 50/26; G06Q 50/40; G05B 19/418; G05B 23/00

USPC ........................................................ 700/295

See application file for complete search history.

(56) References Cited

U.S. PATENT DOCUMENTS

| | | | | |
|---|---|---|---|---|
| 2024/0028599 | A1* | 1/2024 | Aurongzeb | G06F 16/24575 |
| 2024/0069506 | A1* | 2/2024 | Komada | G05B 13/041 |
| 2024/0087073 | A1* | 3/2024 | Komada | G06Q 50/06 |

FOREIGN PATENT DOCUMENTS

| | | | | | |
|---|---|---|---|---|---|
| CN | 114399294 | B | * | 7/2022 | G06Q 10/10 |
| CN | 114861939 | A | * | 8/2022 | G06N 20/00 |
| CN | 116882650 | A | * | 10/2023 | G06Q 10/06311 |
| CN | 118607785 | A | * | 9/2024 | G06Q 50/26 |
| CN | 119365877 | A | * | 1/2025 | |
| DE | 102011001887 | A1 | * | 10/2011 | G06Q 10/04 |
| JP | 2004185223 | A | * | 7/2004 | |
| JP | WO2004081835 | A1 | * | 6/2006 | G06Q 30/06 |
| JP | 2010191498 | A | * | 9/2010 | |
| JP | 2011-028372 | A | | 2/2011 | |
| JP | 2011022892 | A | * | 2/2011 | |
| JP | 5184128 | B2 | * | 4/2013 | |
| JP | 5294146 | B2 | * | 9/2013 | |
| JP | 2016-126372 | A | | 7/2016 | |
| JP | 2016134152 | A | * | 7/2016 | |
| JP | 2023084780 | A | * | 6/2023 | G06Q 50/04 |
| JP | 2023107636 | A | * | 8/2023 | G06Q 10/06375 |
| JP | 2024112062 | A | * | 8/2024 | |
| JP | 2024137045 | A | * | 10/2024 | |
| KR | 102417497 | B1 | * | 7/2022 | G06Q 20/34 |
| WO | WO-2010095687 | A1 | * | 8/2010 | G06Q 10/06 |
| WO | WO-2012104925 | A1 | * | 8/2012 | G05B 19/18 |
| WO | WO-2021241648 | A1 | * | 12/2021 | G06Q 50/04 |

* cited by examiner

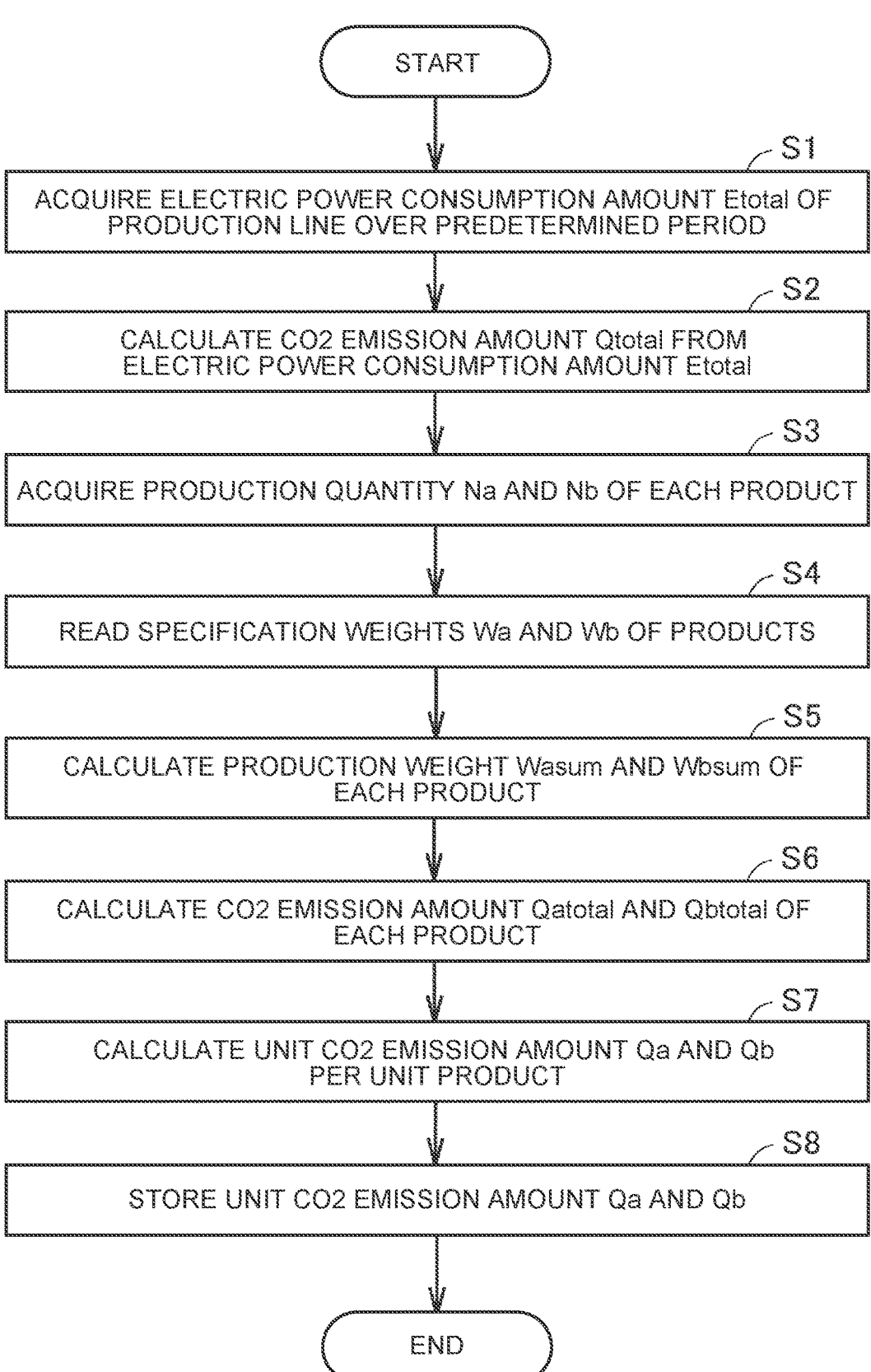

START

S1
ACQUIRE ELECTRIC POWER CONSUMPTION AMOUNT Etotal OF PRODUCTION LINE OVER PREDETERMINED PERIOD

S2
CALCULATE CO2 EMISSION AMOUNT Qtotal FROM ELECTRIC POWER CONSUMPTION AMOUNT Etotal

S3
ACQUIRE PRODUCTION QUANTITY Na AND Nb OF EACH PRODUCT

S4
READ SPECIFICATION WEIGHTS Wa AND Wb OF PRODUCTS

S5
CALCULATE PRODUCTION WEIGHT Wasum AND Wbsum OF EACH PRODUCT

S6
CALCULATE CO2 EMISSION AMOUNT Qatotal AND Qbtotal OF EACH PRODUCT

S7
CALCULATE UNIT CO2 EMISSION AMOUNT Qa AND Qb PER UNIT PRODUCT

S8
STORE UNIT CO2 EMISSION AMOUNT Qa AND Qb

END

DEVICE AND METHOD FOR MANAGING CARDON DIOXIDE EMISSIONS FOR PRODUCTS

CROSS-REFERENCE TO RELATED APPLICATION

This application claims priority to Japanese Patent Application No. 2022-124023 filed on Aug. 3, 2022, incorporated herein by reference in its entirety.

BACKGROUND

1. Technical Field

The present disclosure relates to a management device for managing $CO_2$ emission amounts emitted from production of products (hereinafter also referred to simply as "$CO_2$ emission amounts of products"), and to a management method thereof.

2. Description of Related Art

A growing awareness of environmental issues is leading to increased interest in $CO_2$ emission amounts emitted in order to produce products that are distributed on the market. Accordingly, there are cases in which corporations calculate and manage the $CO_2$ emission amounts emitted in order to produce products. For example, Japanese Unexamined Patent Application Publication No. 2016-126372 (JP 2016-126372 A) discloses a method of calculating $CO_2$ emission amounts in a transportation process of products (including materials and parts).

SUMMARY

Out of $CO_2$ emission amounts emitted to produce a product, the $CO_2$ emission amounts in the production process is sometimes calculated based on the amount of energy (i.e., electric power consumption amount) consumed on a production line by which the product is produced. The $CO_2$ emission amount per unit product can be calculated by dividing the $CO_2$ emission amounts calculated based on the amount of energy consumed on the production line by the production quantity of the product.

Now, a plurality of types of products may be produced on the same production line (mixed production). Since the weight of each product may vary depending on the type of product, for example, the amount of energy and so forth involved in transporting the product by a product transporting vehicle, a conveyor, or the like in a plant can vary. Accordingly, the amount of energy involved in producing each type of product can vary. In such a case, the above method cannot accurately calculate the $CO_2$ emission amounts per unit product. Note that hereinafter, a production line where multiple types of products are produced on the same production line will also be referred to as a "mixed line".

The present disclosure provides a management device and a management method capable of calculating $CO_2$ emission amounts per unit product for products produced on a mixed line with good precision.

(1) A management device according to a first aspect of the present disclosure is a management device that manages a $CO_2$ emission amount emitted by production of products on a production line. The management device includes a storage device that is configured to store a unit weight of a first product and a unit weight of a second product produced on the production line, and a control device that is configured to proportionally divide an electric power consumption amount consumed on the production line over a predetermined period, based on a weight ratio of a total weight of the first product and a total weight of the second product produced on the production line over the predetermined period, and calculate the $CO_2$ emission amount for each product.

According to such a configuration, the control device proportionally divides the electric power consumption amount on the production line over the predetermined period, based on the weight ratio of the total weight of the first product and the total weight of the second product produced on the production line over the predetermined period, and calculates the $CO_2$ emission amount for each product. In this case, the $CO_2$ emission amount for each product is a sum of the $CO_2$ emission amount of the first product produced over the predetermined period and a sum of the $CO_2$ emission amount of the second product produced over the predetermined period. Proportionally dividing the electric power consumption amount that is consumed on the production line over the predetermined period based on the weight ratio enables the $CO_2$ emission amount for each product to be calculated reflecting the weight of the product. The $CO_2$ emission amount per unit product for each product can then be calculated, by dividing the calculated $CO_2$ emission amount for each product by the respective production quantity produced on the production line (mixed line) over the predetermined period, for example. Accordingly, the $CO_2$ emission amount per unit product can be calculated for the products produced on the mixed line with good precision.

(2) In the management device according to the first aspect of the present disclosure, the $CO_2$ emission amount for each product may include a first $CO_2$ emission amount that is a sum of the $CO_2$ emission amount of the first product produced on the production line over the predetermined period, and a second $CO_2$ emission amount that is a sum of the $CO_2$ emission amount of the second product produced on the production line over the predetermined period. The control device may be configured to calculate the $CO_2$ emission amount per unit product of the first product by dividing the first $CO_2$ emission amount by a production quantity of the first product over the predetermined period. The control device may be configured to calculate the $CO_2$ emission amount per unit product of the second product by dividing the second $CO_2$ emission amount by a production quantity of the second product over the predetermined period.

According to such a configuration, dividing the first $CO_2$ emission amount by the production quantity of the first product over the predetermined period enables the $CO_2$ emission amount per unit product of the first product to be calculated, and dividing the second $CO_2$ emission amount by the production quantity of the second product over the predetermined period enables the $CO_2$ emission amount per unit product of the second product to be calculated. Accordingly, the $CO_2$ emission amount per unit product can be calculated for the products produced on the mixed line with good precision.

(3) In the management device according to the first aspect of the present disclosure, the storage device may be configured to store conversion information for converting the electric power consumption amount into the $CO_2$ emission amount. The control device may be configured to convert the electric power consumption amount consumed on the production line over the predetermined period into the $CO_2$ emission amount, using the conversion information.

According to such a configuration, the electric power consumption amount that is consumed on the production line over the predetermined period can be appropriately converted into the $CO_2$ emission amount.

(4) A management method according to a second aspect of the present disclosure is a management method for managing a $CO_2$ emission amount emitted by production of products on a production line. The management method includes reading a unit weight of a first product and a unit weight of a second product produced on the production line, and proportionally dividing an electric power consumption amount consumed on the production line over a predetermined period, based on a weight ratio of a total weight of the first product and a total weight of the second product produced on the production line over the predetermined period, and calculating the $CO_2$ emission amount for each product.

According to the present disclosure, the $CO_2$ emission amount per unit product can be calculated for the products produced on the mixed line with good precision.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is an overall configuration diagram of a management system according to an embodiment;

FIG. 3 is a flowchart showing procedures of processing for calculating a unit $CO_2$ emission amount, which is executed by the control device included in the management device.

DETAILED DESCRIPTION OF EMBODIMENTS

Figure 2:
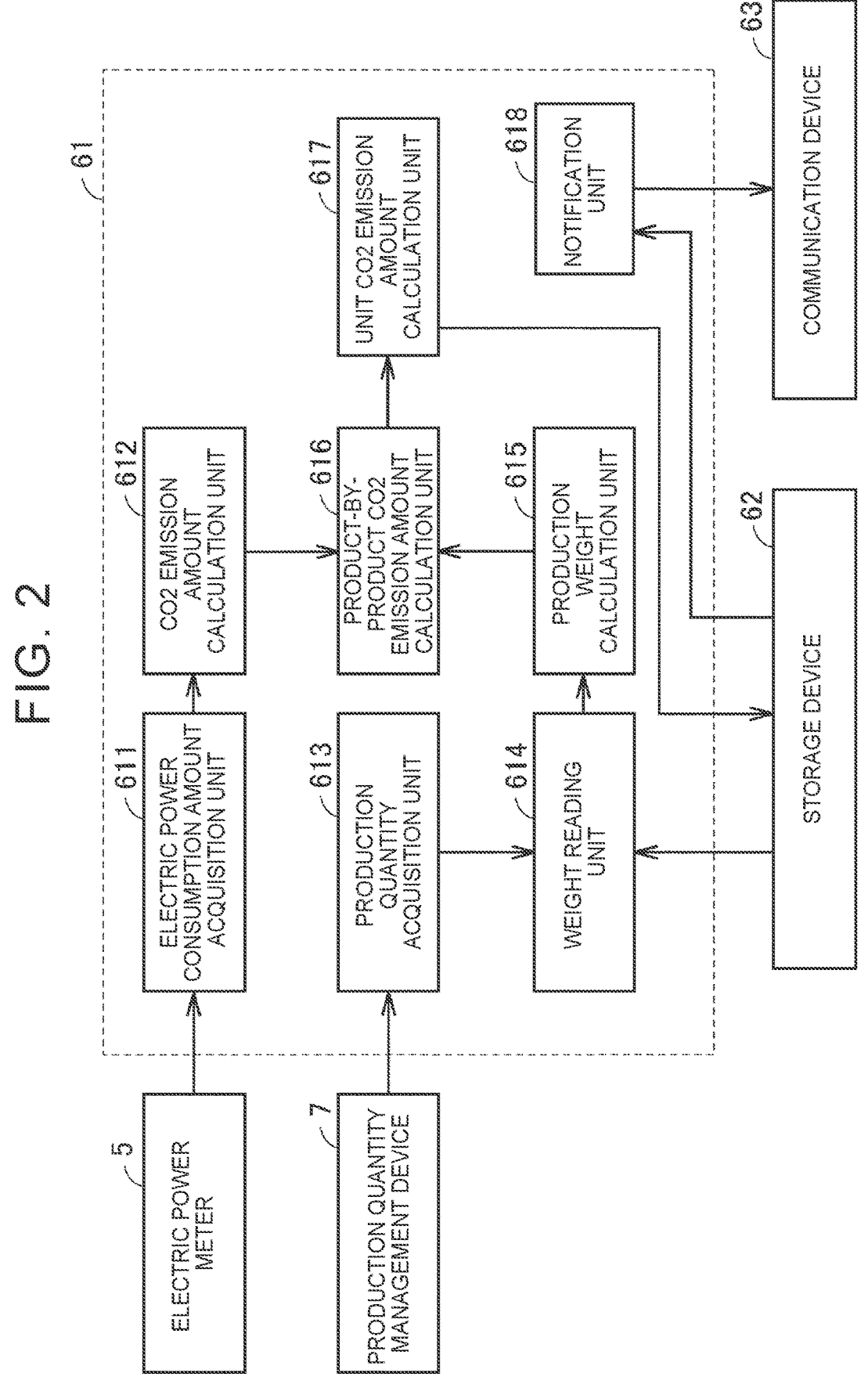
FIG. 2 is a functional block diagram of a control device included in a management device.

Hereinafter, an embodiment of the present disclosure will be described in detail with reference to the drawings. Note that the same or corresponding portions are denoted by the same signs throughout the drawings, and description thereof will not be repeated.

Figure 1:
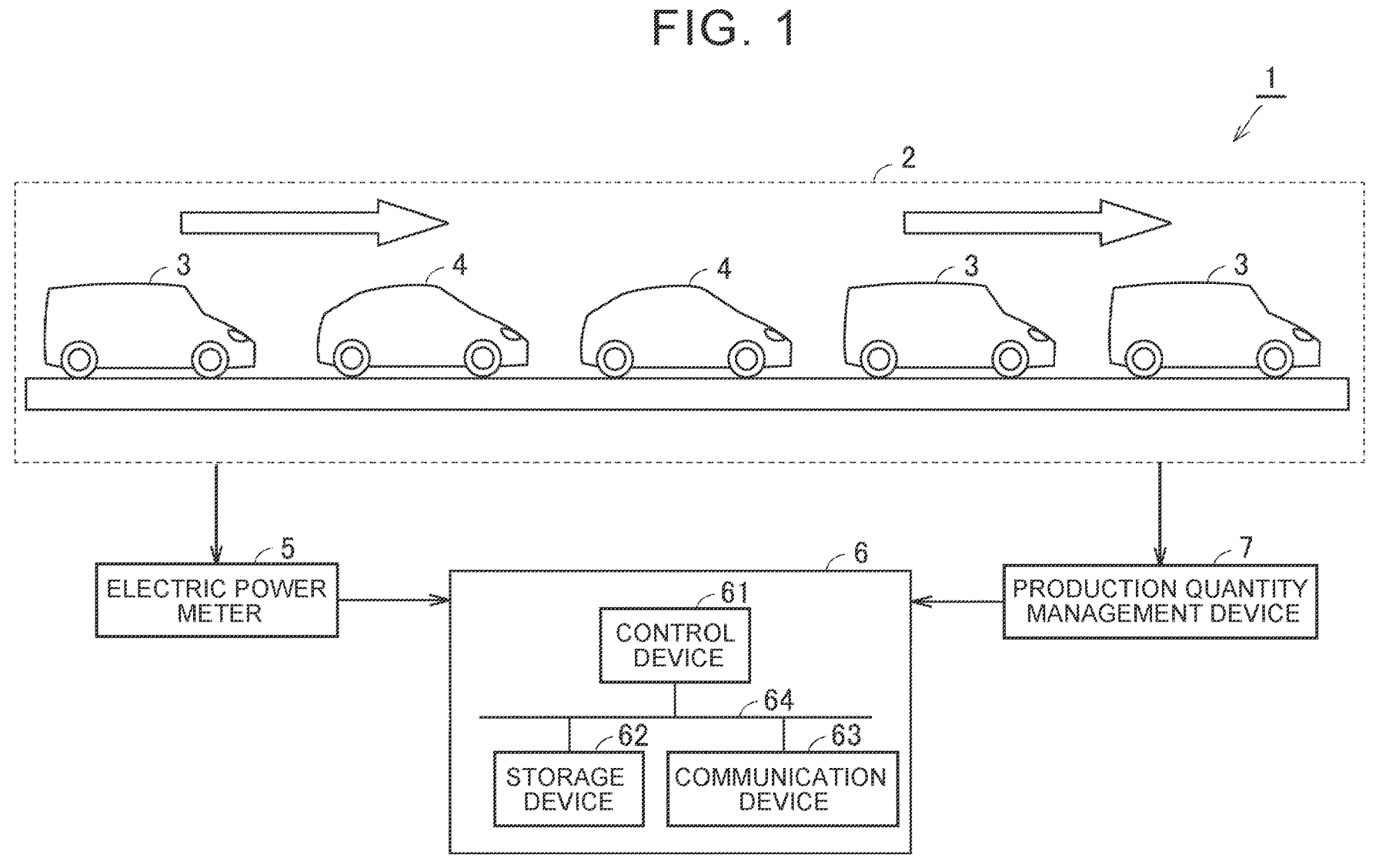

FIG. 1 is an overall configuration diagram of a management system 1 according to the present embodiment. The management system 1 is a system for managing $CO_2$ emission amounts emitted through production of products. The management system 1 is applied, for example, to a plant or the like. In the present embodiment, an example will be described in which the management system 1 is applied to an automobile production plant of a certain corporation. It should be noted that application of the management system 1 is not limited to automobile production plants, and that the management system 1 can be applied to, for example, production plants of various types of products, such as production plants for parts, production plants for materials, and so forth. That is to say, the type of product is irrelevant.

The management system 1 includes a production line 2, an electric power meter 5, a management device 6, and a production quantity management device 7. The management system 1 manages $CO_2$ emission amounts of products produced on the production line 2.

Multiple types of products are produced on the production line 2. That is to say, the production line 2 is a mixed line. In the present embodiment, two types of products, a product 3 and a product 4, are produced on the production line 2. The product 3 and the product 4 are vehicles. The product 3 and the product 4 are different vehicle models. The production line 2 may be, for example, a vehicle assembly line. Note that the number of types of products produced on the production line 2 is not limited to two. The number of types of products produced on the production line 2 may be three or more.

The production quantity management device 7 aggregates the production quantity of products for each predetermined period for each type of product. The predetermined period is, for example, 24 hours. Note that the predetermined period is not limited to 24 hours, and can be set as appropriate. The production quantity management device 7 aggregates a production quantity Na of the product 3 and a production quantity Nb of the product 4 over the predetermined period. The production quantity management device 7 may include an imaging device, for example, and may aggregate the production quantity of products by analyzing images taken by the imaging device. Also, the production quantity management device 7 may include an input device, for example, and aggregate the production quantity of the product based on input to the input device by an operator. The production quantity management device 7 transmits the production quantity Na of the product 3 and the production quantity Nb of the product 4 over the predetermined period to the management device 6 at a timing that is set in advance.

The electric power meter 5 measures the amount of electric power consumed on the production line 2 (electric power consumption amount). The electric power meter 5 measures the electric power consumed on the production line 2, and calculates an electric power consumption amount Etotal consumed on the production line 2 over the predetermined period. The electric power meter 5 transmits the electric power consumption amount Etotal to the management device 6 at a timing that is set in advance. The electric power consumed by the production line 2 may be, for example, electric power consumed in a plant building in which the production line 2 is installed. The electric power consumed in the plant building can include electric power that is used to operate all equipment related to production of products, such as, for example, air conditioning, lighting, parts transporting vehicles (forklifts and so forth), conveyors on the production line 2, impact wrenches, assembly devices, and so forth. For example, when the plant building has a plurality of production lines installed therein, the electric power consumed by the production line 2 may include the electric power for operating equipment related to the production of products produced on production line 2, and not include electric power for operating equipment related to the production of products produced on other production lines.

Note that the management device 6 may be imparted with functions of at least one of the production quantity management device 7 and the electric power meter 5. That is to say, the management device 6 may manage the production quantity of products produced on the production line 2, and the management device 6 may measure the electric power consumption amount that is consumed on the production line 2.

The management device 6 notifies downstream corporations in a supply chain (corporations to which products produced on the production line 2 are supplied) regarding $CO_2$ emission amounts involved in the production of the supplied products ($CO_2$ emission amounts emitted by the production of the supplied products). The management device 6 includes a control device 61, a storage device 62, and a communication device 63. The control device 61, the storage device 62, and the communication device 63 are connected to a bus 64.

The control device 61 includes, for example, a central processing unit (CPU), memory, and an input/output port through which various types of signals are input/output (all omitted from illustration). The control device 61 executes various types of programs stored in the memory. The various types of programs include an operating system and so forth. The memory is made up of, for example, read-only memory (ROM) that stores the various types of programs described above, and random-access memory (RAM) that functions as working memory and temporarily stores various types of data necessary for executing the various types of programs.

The storage device 62 is configured to be capable of storing various types of information. The storage device 62 stores information regarding unit weight of products produced on the production line 2. The unit weight may be, for example, a weight defined in specifications of the product (hereinafter also referred to as "specification weight"). That is to say, the storage device 62 stores a specification weight Wa of the product 3 and a specification weight Wb of the product 4.

The storage device 62 further stores a conversion formula (conversion information) for converting electric power consumption amounts into $CO_2$ emission amounts. The conversion formula may be, for example, the electric power consumption amount multiplied by a $CO_2$ emission factor. The $CO_2$ emission factor is provided by, for example, an electric power supplier (electric power company). The conversion formula is stored in the storage device 62. The conversion formula stored in the storage device 62 is updated by the control device 61, for example, when the $CO_2$ emission factor is updated.

The communication device 63 is configured to be communicable with devices (omitted from illustration) of downstream corporations in the supply chain. Communication between the communication device 63 and the devices of the downstream corporations is performed via, for example, the Internet or the like. Also, the communication device 63 is configured to be communicable with the production quantity management device 7 and the electric power meter 5. Communication between the communication device 63, and the production quantity management device 7 and the electric power meter 5, may be wired communication or wireless communication.

FIG. 2 is a functional block diagram of the control device 61 included in the management device 6. The control device 61 includes an electric power consumption amount acquisition unit 611, a $CO_2$ emission amount calculation unit 612, a production quantity acquisition unit 613, a weight reading unit 614, a production weight calculation unit 615, a product-by-product $CO_2$ emission amount calculation unit 616, a unit $CO_2$ emission amount calculation unit 617, and a notification unit 618. The control device 61 functions as the electric power consumption amount acquisition unit 611, the $CO_2$ emission amount calculation unit 612, the production quantity acquisition unit 613, the weight reading unit 614, the production weight calculation unit 615, the product-by-product $CO_2$ emission amount calculation unit 616, the unit $CO_2$ emission amount calculation unit 617, and the notification unit 618, by executing a program stored in memory, for example. Note that the electric power consumption amount acquisition unit 611, the $CO_2$ emission amount calculation unit 612, the production quantity acquisition unit 613, the weight reading unit 614, the production weight calculation unit 615, the product-by-product $CO_2$ emission amount calculation unit 616, the unit $CO_2$ emission amount calculation unit 617, and the notification unit 618 may be realized by dedicated hardware (electronic circuits), for example.

The electric power consumption amount acquisition unit 611 acquires the electric power consumption amount Etotal of the production line 2 over the predetermined period from the electric power meter 5. The electric power consumption amount acquisition unit 611 outputs the electric power consumption amount Etotal to the $CO_2$ emission amount calculation unit 612.

The $CO_2$ emission amount calculation unit 612 reads out the conversion formula from the storage device 62. The $CO_2$ emission amount calculation unit 612 inputs the electric power consumption amount Etotal into the conversion formula to calculate a $CO_2$ emission amount Qtotal emitted on the production line 2 over the predetermined period. The $CO_2$ emission amount calculation unit 612 outputs the $CO_2$ emission amount Qtotal to the product-by-product $CO_2$ emission amount calculation unit 616.

The production quantity acquisition unit 613 acquires the production quantity of each product (product 3 and product 4) produced on the production line 2 over the predetermined period from the production quantity management device 7. Specifically, the production quantity acquisition unit 613 acquires the production quantity Na of the product 3 and the production quantity Nb of the product 4 from the production quantity management device 7. The production quantity acquisition unit 613 outputs the production quantity Na and the production quantity Nb to the weight reading unit 614. Note that the production quantity acquisition unit 613 may output the production quantity Na and the production quantity Nb to the production weight calculation unit 615.

The weight reading unit 614 reads the specification weight Wa of the product 3 and the specification weight Wb of the product 4 from the storage device 62. The weight reading unit 614 outputs the specification weights Wa and Wb and the production quantities Na and Nb to the production weight calculation unit 615.

The production weight calculation unit 615 calculates the production weight for each product over the predetermined period using the specification weights Wa and Wb and the production quantities Na and Nb. Specifically, the production weight calculation unit 615 multiplies the specification weight Wa and the production quantity Na to calculate a production weight Wasum, which is a total weight of the products 3 produced on the production line 2 over the predetermined period. The production weight calculation unit 615 multiplies the specification weight Wb and the production quantity Nb to calculate a production weight Wbsum, which is a total weight of the products 4 produced on the production line 2 over the predetermined period. The production weight calculation unit 615 outputs the production weights Wasum and Wbsum to the product-by-product $CO_2$ emission amount calculation unit 616.

Based on a weight ratio of the products 3 and 4 produced over the predetermined period, the product-by-product $CO_2$ emission amount calculation unit 616 calculates a $CO_2$ emission amount Qatotal emitted by the production of the product 3 over the predetermined period and a $CO_2$ emission amount Qbtotal emitted by the production of the product 4 over the predetermined period. Specifically, the product-byproduct $CO_2$ emission amount calculation unit 616 calculates the $CO_2$ emission amount Qatotal and the $CO_2$ emission amount Qbtotal using the following Expressions (1) and (2), respectively.

$$Qatotal=Qtotal \times Wasum/(Wasum+Wbsum) \qquad (1)$$

$$Qbtotal=Qtotal \times Wbsum/(Wasum+Wbsum) \qquad (2)$$

The product-by-product $CO_2$ emission amount calculation unit 616 outputs the $CO_2$ emission amounts Qatotal and Qbtotal to the unit $CO_2$ emission amount calculation unit 617.

The unit $CO_2$ emission amount calculation unit 617 calculates a unit $CO_2$ emission amount Qa of the product 3 produced over the predetermined period and a unit $CO_2$ emission amount Qb of the product 4 produced over the predetermined period. The unit $CO_2$ emission amount is a $CO_2$ emission amount per unit product. Specifically, the unit $CO_2$ emission amount Qa is the $CO_2$ emission amount per one product 3 (per unit product 3). The unit $CO_2$ emission amount Qb is the $CO_2$ emission amount per one product 4 (per unit product 4). The unit $CO_2$ emission amount calculation unit 617 calculates the unit $CO_2$ emission amounts Qa and Qb using the following Expressions (3) and (4), respectively.

$$Qa=Qatotal/Na \qquad (3)$$

$$Qb=Qbtotal/Nb \qquad (4)$$

Each product 3 produced on the production line 2 is given an identification number. The unit $CO_2$ emission amount calculation unit 617 stores the unit $CO_2$ emission amount Qa in the storage device 62 in association with the identification number of each product 3 produced on the production line 2. The storage device 62 stores a $CO_2$ emission amount Qaall involved in the production of the product 3 (single unit). The $CO_2$ emission amount Qaall involved in the production of the product 3 (single unit) is calculated by adding the unit $CO_2$ emission amount Qa to a $CO_2$ emission amount Qapre involved in procuring raw materials for parts that make up the product 3, and producing and transporting those parts. The unit $CO_2$ emission amount calculation unit 617 stores the unit $CO_2$ emission amount Qa in the storage device 62, thereby updating the $CO_2$ emission amount Qaall. Also, each product 4 produced on the production line 2 is given an identification number. The unit $CO_2$ emission amount calculation unit 617 stores the unit $CO_2$ emission amount Qb in the storage device 62 in association with the identification number of each product 4 produced on the production line 2. The storage device 62 stores a $CO_2$ emission amount Qball involved in the production of the product 4 (single unit). The $CO_2$ emission amount Qball involved in the production of the product 4 (single unit) is calculated by adding the unit $CO_2$ emission amount Qb to a $CO_2$ emission amount Qbpre involved in procuring raw materials for parts that make up the product 4, and producing and transporting those parts. The unit $CO_2$ emission amount calculation unit 617 stores the unit $CO_2$ emission amount Qb in the storage device 62, thereby updating the $CO_2$ emission amount Qball. Note that the $CO_2$ emission amounts Qapre and Qbpre are stored in the storage device 62 in advance, upon receiving notification from upstream corporations.

For example, a case will be assumed in which a product 3 is delivered to a downstream corporation. In this case, in response to a request from the downstream corporation, or being triggered by the delivery of the product 3, the notification unit 618 uses the identification number of the product

3 delivered to the downstream corporation as a key to read the $CO_2$ emission amount Qaall of the product 3 from the storage device 62. The notification unit 618 then outputs, to the communication device 63, a control signal for transmitting the $CO_2$ emission amount Qaall of the product 3, along with information for identifying the product 3 delivered to the downstream corporation, to a device of the downstream corporation. Thus, information for identifying the product 3 delivered to the downstream corporation and information regarding the $CO_2$ emission amount Qaall of the product 3 are notified to the downstream corporation via the communication device 63. Note that it is sufficient for the information for identifying the product 3 delivered to the downstream corporation to be any information that allows the downstream corporation to identify which product the $CO_2$ emission amount Qaall that is notified belongs to, and may be the aforementioned identification number, or may be a delivery number printed on a delivery slip or the like, for example.

Figure 4:
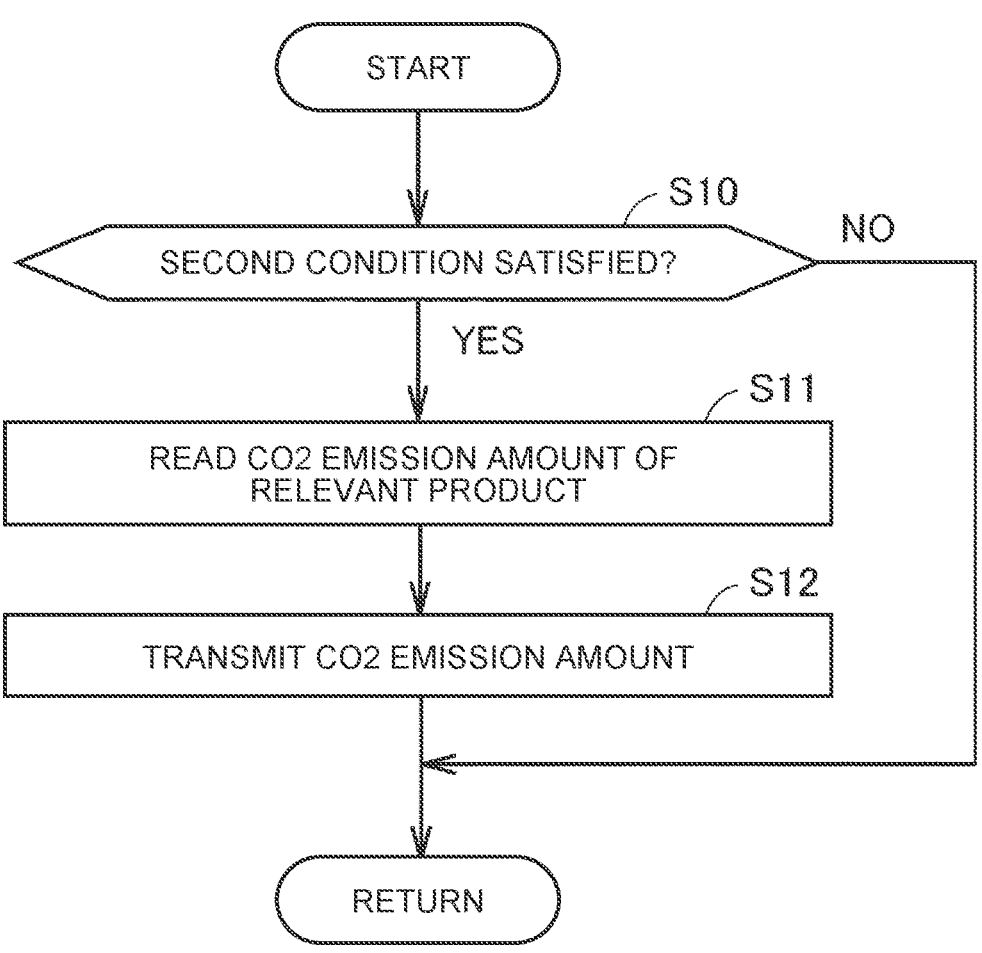
FIG. 4 is a flowchart showing procedures of processing for notification of the unit $CO_2$ emission amount, which is executed by the control device included in the management device.

FIG. 3 is a flowchart showing procedures of processing for calculating the unit $CO_2$ emission amount, which is executed by the control device 61 included in the management device 6. This flowchart is started by the control device 61 when a first condition is satisfied. The first condition may be, for example, that a predetermined period has elapsed since the processing was executed a previous time. For example, when the predetermined period is 24 hours, the first condition can be the passage of one day (e.g., change of date). Although a case will be described in which each step (hereinafter step is abbreviated to "S") in the flowcharts shown in FIG. 3 and in later-described FIG. 4 is realized by software processing by the control device 61, part or all of the steps may be realized by hardware (electronic circuit) built into the control device 61.

In S1, the control device 61 acquires the electric power consumption amount Etotal of the production line 2 over the predetermined period from the electric power meter 5.

In S2, the control device 61 reads the conversion formula from the storage device 62, inputs the electric power consumption amount Etotal into the conversion formula, and calculates the $CO_2$ emission amount Qtotal emitted on the production line 2 over the predetermined period.

In S3, the control device 61 acquires the production quantity Na of the product 3, and the production quantity Nb of the product 4 produced on the production line 2 over the predetermined period, from the production quantity management device 7.

In S4, the control device 61 reads the specification weight Wa of the product 3 and the specification weight Wb of the product 4 from the storage device 62.

In S5, the control device 61 performs multiplication of the specification weight Wa and the production quantity Na to calculate a production weight Wasum, which is the total weight of the products 3 produced on the production line 2 over the predetermined period. The control device 61 further performs multiplication of the specification weight Wb and the production quantity Nb to calculate a production weight Wbsum, which is the total weight of the products 4 produced on the production line 2 over the predetermined period.

In S6, based on a weight ratio of the products 3 and 4 produced over the predetermined period, the control device 61 calculates the $CO_2$ emission amount Qatotal emitted by the production of the product 3 over the predetermined period and the $CO_2$ emission amount Qbtotal emitted by the production of the product 4 over the predetermined period. The control device 61 calculates the $CO_2$ emission amounts Qatotal and Qbtotal in accordance with the above Expressions (1) and (2), respectively.

In S7, the control device 61 calculates the unit $CO_2$ emission amount Qa of the product 3 produced over the predetermined period and the unit $CO_2$ emission amount Qb of the product 4 produced over the predetermined period. The control device 61 calculates the unit $CO_2$ emission amounts Qa and Qb in accordance with the above Expressions (3) and (4), respectively.

In S8, the control device 61 stores the unit $CO_2$ emission amount Qa in the storage device 62, in association with the identification number of each of the products 3 produced over the predetermined period. Further, the control device 61 stores the unit $CO_2$ emission amount Qb in the storage device 62, in association with the identification number of each of the products 4 produced over the predetermined period. Thus, the $CO_2$ emission amount Qaall of product 3 and the $CO_2$ emission amount Qball of product 4 are updated.

FIG. 4 is a flowchart showing procedures of processing for notification of the unit $CO_2$ emission amount, which is executed by the control device 61 included in the management device 6. This flowchart is repeatedly executed by the control device 61 at a predetermined cycle.

In S10, the control device 61 determines whether a second condition is satisfied. The second condition may be at least one of, for example, (i) that the product produced on the production line 2 has been delivered to the downstream corporation, (ii) that the product produced on the production line 2 has been delivered to the downstream corporation and a request has been made by the downstream corporation for disclosure of information regarding the $CO_2$ emission amount of the delivered product (relevant product), and so forth. When the control device 61 determines that the second condition is satisfied (YES in S10), the processing advances to S11. When control device 61 determines that the second condition is not satisfied (NO in S10), the processing returns.

In S11, the control device 61 reads the $CO_2$ emission amount of the product (relevant product) from the storage device 62 using the identification number of the relevant product as a key.

In S12, the control device 61 outputs, to the communication device 63, a control signal for transmitting information for identifying the relevant product (the product delivered to the downstream corporation), and information regarding the $CO_2$ emission amount that is read in S11, to a device of the downstream corporation. Thus, the information identifying the relevant product and the information regarding the $CO_2$ emission amount of the product are transmitted to the downstream corporation via the communication device 63.

As described above, in the management system 1 according to the present embodiment, the $CO_2$ emission amount Qtotal emitted on the production line 2 over the predetermined period is proportionally divided into the $CO_2$ emission amount Qatotal emitted from the production of the product 3 and the $CO_2$ emission amount Qbtotal emitted from the production of the product 4, based on the weight ratio of the products 3 and 4 produced on the production line 2 over the predetermined period.

The amount of energy involved in transporting a product by a product transporting vehicle, a conveyor, or the like in a plant varies depending on the weight of the product, and thus the amount of energy involved in production varies for each type of product. Accordingly, in a mixed line that produces multiple products on the same production line, the unit $CO_2$ emission amount for each type of product cannot be calculated with high precision by a method that simply proportionally divides the $CO_2$ emission amount Qtotal emitted on the production line 2 by the production quantity.

In the management system 1 according to the present embodiment, the unit $CO_2$ emission amount Qa of the product 3 and the unit $CO_2$ emission amount Qb of the product 4 are calculated by respectively dividing the $CO_2$ emission amounts Qatotal and Qbtotal calculated based on the weight ratio of the products 3 and 4 produced on the production line 2 over the predetermined period, by the production quantity Na of the product 3 and the production quantity Nb of the product 4, which were produced on the production line 2 over the predetermined period. This enables the unit $CO_2$ emission amount for each product to be calculated with good precision.

Modification

It is also conceivable to form a consortium among corporations involved in the supply chain and share information among the corporations using distributed ledger technology. In this case, the management device 6 may function as a node to form a distributed ledger network with the nodes of downstream corporations. The management device 6 (node) transmits transaction data, including $CO_2$ emission amounts of relevant products to be notified to downstream corporations, to the distributed ledger network. The downstream corporations are notified of the $CO_2$ emission amounts of the relevant products by the nodes of the downstream corporations approving this transaction data. Using distributed ledger technology to perform notification of $CO_2$ emission amounts can make information more resistant to tampering. Also, unit $CO_2$ emission amounts can be calculated and $CO_2$ emission amounts of products can be calculated in the modification by the same method as in the embodiment.

The embodiments disclosed herein should be considered to be exemplary and not restrictive in all respects. The scope of the present disclosure is set forth by the claims, rather than the description above, and is intended to include all modifications within the meaning and the scope equivalent to the claims.

What is claimed is:

1. A system comprising:
a production line configured to manufacture at least a first product and a second product;
an electric power meter configured to measure an electric power consumption amount used on the production line over a predetermined period;
a management device that is configured to manage a $CO_2$ emission amount emitted by production of the first product and the second product on the production line, the management device comprising:
a storage device that is configured to store a unit weight of the first product and a unit weight of the second product produced on the production line; and
a control device that is configured to proportionally divide the electric power consumption amount consumed on the production line over the predetermined period, based on a weight ratio of a total weight of the first product and a total weight of the second product produced on the production line over the predetermined period, and calculate the $CO_2$ emission amount for each product,
wherein:
the management device is configured to function as a node in a distributed ledger network with nodes of other management devices, the management device is configured to transmit the CO2 emission amount for each product to the other management devices, via the distributed ledger network, and the other management devices are configured to be notified of the CO2 emission amount for each product by the other management devices approving transaction data.

2. The system according to claim 1, wherein:

the $CO_2$ emission amount for each product includes a first $CO_2$ emission amount that is a sum of the $CO_2$ emission amount of the first product produced on the production line over the predetermined period, and a second $CO_2$ emission amount that is a sum of the $CO_2$ emission amount of the second product produced on the production line over the predetermined period; and the control device is configured to calculate the $CO_2$ emission amount per unit product of the first product by dividing the first $CO_2$ emission amount by a production quantity of the first product over the predetermined period, and calculate the $CO_2$ emission amount per unit product of the second product by dividing the second $CO_2$ emission amount by a production quantity of the second product over the predetermined period.

3. The system according to claim 1, wherein:

the storage device is configured to store conversion information for converting the electric power consumption amount into the $CO_2$ emission amount; and the control device is configured to convert the electric power consumption amount consumed on the production line over the predetermined period into the $CO_2$ emission amount, using the conversion information.

4. A method of production and managing a $CO_2$ emission amount emitted by production of products on a production line, the method comprising:

controlling the production line to manufacture at least a first product and a second product;

controlling an electric power meter to measure an electric power consumption amount used on the production line over a predetermined period; and controlling a management device to execute:

reading a unit weight of the first product and a unit weight of the second product produced on the production line; and proportionally dividing the electric power consumption amount consumed on the production line over the predetermined period, based on a weight ratio of a total weight of the first product and a total weight of the second product produced on the production line over the predetermined period, and calculating the $CO_2$ emission amount for each product, wherein:

the management device functions as a node in a distributed ledger network with nodes of other management devices, the management device transmits the CO2 emission amount for each product to the other management devices, via the distributed ledger network, and the other management devices are notified of the CO2 emission amount for each product by the other management devices approving transaction data.

* * * * *